(12) United States Patent
Mitchell et al.

(10) Patent No.: US 7,853,930 B2
(45) Date of Patent: Dec. 14, 2010

(54) ANNOTATING GRAPHS TO ALLOW QUICK LOADING AND ANALYSIS OF VERY LARGE GRAPHS

(75) Inventors: Nick M. Mitchell, White Plains, NY (US); Gary S. Sevitsky, New York, NY (US); Herbert G. Derby, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 1005 days.

(21) Appl. No.: 11/029,070

(22) Filed: Jan. 4, 2005

(65) Prior Publication Data
US 2006/0150168 A1    Jul. 6, 2006

(51) Int. Cl.
*G06F 9/44* (2006.01)
(52) U.S. Cl. .................... 717/131; 717/124; 717/125; 717/156
(58) Field of Classification Search .......... 717/124–131, 717/156
See application file for complete search history.

(56) References Cited

U.S. PATENT DOCUMENTS

| | | | |
|---|---|---|---|
| 6,064,819 A * | 5/2000 | Franssen et al. ............. | 717/156 |
| 6,427,234 B1 * | 7/2002 | Chambers et al. ........... | 717/140 |
| 7,305,409 B2 * | 12/2007 | Lord et al. ................... | 707/102 |
| 2004/0078540 A1 * | 4/2004 | Cirne et al. .................. | 711/170 |
| 2005/0071813 A1 * | 3/2005 | Reimer et al. ............... | 717/125 |
| 2005/0204342 A1 * | 9/2005 | Broussard ..................... | 717/124 |
| 2006/0123400 A1 * | 6/2006 | Burdick et al. .............. | 717/130 |

OTHER PUBLICATIONS

Graham J. Wills, "Interactive Visualization of Very Large Graphs," Journal of Computational and Graphical Statistics, vol. 8, No. 2, pp. 190-212.
Inderjeet Mani, Eric Bloedorn, "Summarizing Similarities and Differences Among Related Documents," Journal of Information Retrieval, vol. 1, pp. 35-67.
Anna C. Gilbert, Kirill Levchenko, "Compressing Network Graphs," Workshop on Link Analysis and Group Detection, 2004.
Neoklis Polyzotis, Minos Garofalakis, "Structure and Value Synopses for XML Data Graphs," in the Proceedings of the 28$^{th}$ Very Large Data Bases Conference.

* cited by examiner

*Primary Examiner*—Lewis A Bullock, Jr.
*Assistant Examiner*—Michael Yaary
(74) *Attorney, Agent, or Firm*—Michael J. Buchenhorner; Derek S. Jennings (57) ABSTRACT

A method, information processing system, and computer readable medium for annotating graphs to allow for subsequent quick loading and analysis of very large graphs is described. The present invention encompasses a way to order and annotate nodes of a graph into a data stream that allows for optimization of subsequent processing of nodes in later analysis. For example, a very large reference graph representing heap snapshots may be annotated to facilitate post-processing and visualization of the heap for memory leak analysis. In such an example, the present invention reduces the number of objects and references to be modeled in memory, while still capturing the essence of the non-modeled portions. In this example, the present invention may process reference graphs on the scale of one hundred million live objects per snapshot using a computer with one gigabyte of memory.

9 Claims, 9 Drawing Sheets

| | | label | type | |
|---|---|---|---|---|
| 402 | ( 1 | instance | Finalizer | other annotations |
| 404 | ) 1 | | | |
| 406 | ( 3 | instance | Vector | other annotations |
| 408 | ( 4 | array | Object | other annotations |
| 410 | ( 2 | instance | String | other annotations |
| 412 | ) 2 | | | |
| 414 | ( 5 | instance | String | other annotations |
| 416 | ) 5 | | | |
| 418 | ) 4 | | | |
| 420 | ) 3 | | | |

ANNOTATING GRAPHS TO ALLOW QUICK LOADING AND ANALYSIS OF VERY LARGE GRAPHS

CROSS-REFERENCE TO RELATED APPLICATIONS

Not Applicable.

STATEMENT REGARDING FEDERALLY SPONSORED-RESEARCH OR DEVELOPMENT

Not Applicable.

INCORPORATION BY REFERENCE OF MATERIAL SUBMITTED ON A COMPACT DISC

Not Applicable.

FIELD OF THE INVENTION

The invention broadly relates to the field of information processing systems and more particularly relates to the field of processing very large graphs.

BACKGROUND OF THE INVENTION

Analyzing large amounts of data in a computer system, which by its nature has a limited amount of processing resources available, has long been a challenge in computer science. In one particular example, finding a program bug that causes a system to run out of memory is difficult because performing the analysis requires memory in which to store analytic data and make computations related to the analysis. While the solutions described herein are particularly exemplified in terms of such a computer memory analysis, it will be clear to one of ordinary skill in the art that the solution provided by the present invention is equally applicable to other types of analytic tasks involving very large graphs.

Memory analysis has become an important area of focus for information processing systems. Problems such as excessive memory footprint or unbounded memory growth over time are common causes of system slowdown and failure. For large-scale systems, understanding the behavior of a program's memory usage over time, and finding the root cause of memory allocation problems, may be difficult with currently available techniques. One area of particular concern is that of "memory leaks." A memory leak may be understood generally to be a bug in a computer program which causes the program to acquire memory from the system, but never return that memory to the system. Such a program, running long enough, will eventually consume all the memory of the system, causing the system to fail. A program bug of this type is often called a "memory leak" by those of skill in the art. This problem may occur in programs written in any computer programming language, but is particularly described herein in terms of the Java programming language, by way of example. Various concepts of mathematics and computer science are required to understand the present invention. The following sections introduce some of these concepts, and references for other sources are incorporated into this description.

Memory Leaks

An object is a construct of a computing machine. To instantiate an object, a computer allocates a portion of its memory in which to store the object. During operation of a computer, objects are continually created, used and become obsolete. As computer memory is generally limited, resources assigned to obsolete objects (objects no longer required by any other existing object) must be collected and returned to the system for reuse. Unlimited object generation and/or growth without object destruction obviously leads to an unsustainable system. Some computer programming languages, such as Java, ML, and LISP, provide no mechanism for immediate release of memory resources. Furthermore, programming errors, program design flaws, use of libraries and frameworks, program complexity, multitasking and other factors contribute to the inevitable problem in large and complex programs of "memory leaks," i.e., unintentional and unconstrained growth of the memory resources allocated to a program. Memory leaks lead to poor performance and often to program "crashes."

Despite the automatic garbage collection of objects in the Java computer programming language, in which the Java Virtual Machine attempts to recover improperly managed memory, memory leaks remain a significant problem for many Java applications. A memory leak occurs in a Java program when the program inadvertently maintains references to objects that are no longer needed, preventing the garbage collector from reclaiming that memory. Memory leak problems are easy to spot, but are often difficult to solve. The likelihood that a memory leak exists may be determined by using black box analysis, such as by monitoring the memory heap after each round of garbage collection. When each round of garbage collection frees less and less memory space, until the application grinds to a halt for lack of memory, a memory leak is the likely culprit.

Memory leak analysis may be performed using tools which represent objects, such as Java objects, and their relationship to other objects using graphs. Understanding the graphs and seeing patterns in the graphs can lead a programmer to the particular error in a computer program which is causing the memory leak. Unfortunately, the number of objects and size of the resultant graphs makes it prohibitive to interpret these graphs manually. Aspects of the programming language, particularly Java, may also complicate the problem of memory leak analysis. For example, Java includes the concept of a "finalizer," which may be created by a protected method of the class "object," and which allows the programmer to define "clean up" operations to be performed automatically when an object is to be destroyed or collected as garbage. A finalizer instance may appear in a memory image ("snapshot") to be maintaining a link to an object that keeps the object "alive," but which is not the likeliest source of a memory leak associated with an object. Understanding these types of constructs, and their use in memory leak analysis, is instructive in understanding the present invention.

Some Preliminary Concepts in Computer Science and Mathematics

In mathematics and particularly in computer science, a graph is often defined as an abstract description or organization of data, represented as a set of items connected by edges. Each item is called a vertex or node. An edge is a connection between two nodes of a graph. In a directed graph, an edge goes from one node, the source, to another node, the target, and hence makes connection in only one direction. Formally, a graph is a set of nodes and a binary relation between nodes. A graph can be understood as a set of objects (nodes) and the relationships (edges) between them.

In computer science, a tree is a graph-type data structure which may be said to have a root node, and one or more additional nodes. Each additional node is either a leaf (a terminal node) or an internal node representing a "sub-tree."

A tree may be understood to be a connected, undirected, acyclic graph, with a root and ordered nodes.

As generally used in computer science, a node N in a graph dominates another node M in that graph when all paths from the graph roots to M must include N. (A graph root may be defined as a node without a predecessor.) In computer science applications these nodes may represent statements in computer program code, basic blocks in program code, or instances in an object reference graph. Conventionally, it is said that an object dominates itself. Note that a single object may have multiple dominators. The concept of an immediate dominator may sometimes be more useful. An immediate dominator is a unique object that dominates another object, while not dominating any other dominator of the first object. A tree where each object's parent is its immediate dominator may be called a dominator tree.

A heap may be defined as an area of memory used for dynamic memory allocation where blocks of memory are allocated and freed in an arbitrary order and the pattern of allocation and size of blocks is not known until run time. Typically, a program has one heap which it may use for several different purposes.

A graph snapshot may be described as a set of nodes, type definitions, and relations between these two; both the nodes and the types have unique identifiers. For example, the snapshot may relate nodes to nodes, in which case it defines edges; it may also relate nodes to types, in which case it may either classify the nodes by capability or by dynamic state. Of particular interest are the dynamic states associated with specially-identified roots of the graph; that is, nodes that aren't graph roots because they have predecessors in the edge relation, but, for reasons external to the process that created the graph, have been asserted to be pointed to be nodes that do not appear in the node set. For example, objects in Java that are held by a lock at the time the snapshot is acquired may have such an annotation. Each node or type may come with a set of associated annotations; example annotations include size, age, and name.

A population snapshot is that proper subset of a graph snapshot that excludes the edge relation. Thus, collecting, storing, and reading a population snapshot should always be cheaper than doing likewise on the corresponding graph snapshot. In this way, a process that takes as input a population snapshot, rather than a graph snapshot, is doing in the interests of efficiency, not necessity. Vice versa, some aspects of an embodiment may require the full information of a graph snapshot.

Whether in a population snapshot or graph snapshot, the term snapshot indicates a point-in-time view of a possibly changing graph. Therefore, it may be understood that the snapshots may be totally ordered in time. A sequence of snapshots may thus be a series of snapshots ordered in time.

If a node has a certain identity in one snapshot of a sequence, then nodes in other snapshots of the same sequence with the same identifier are the same node. In other words, a uniqueness of identifiers should be maintained across the snapshots.

When considering a sequence of snapshots, one may identify the first snapshot that contains a particular node. Thus, a node's age may be estimated from a sequence of snapshots. This kind of age is a generational view of age, as opposed to one that ages nodes by wall-clock time since creation. Alternatively, a graph snapshot may include age annotations reflecting the age of objects represented in the graph. For simplicity of example, it may be assumed that such ages are generational. A node may be considered nascent if its age is that of the newest generation of nodes.

A node may be described as being on the fringe in a graph snapshot if it is nascent and its immediate owner is not. Our prior patent application, U.S. patent application Ser. No. 10/1073,848, defined the concept of a "change proxy": a data type located in a particular place in the dominator forest of a graph snapshot, where nodes that match this pattern are part on the wavefront of some change in a graph. While that application also gave a process for finding change proxies in a series of snapshot, the current one relies only on that definition. Any process that may identify change proxies may be compatible with the present invention described herein.

These constructs, and others described herein, would be familiar to one of ordinary skill in the art as it relates to the present invention.

Tools for Diagnosing Memory Leaks

A number of diagnostic tools exist to help programmers determine the primary cause of a memory leak. Programs generally obtain memory for creating objects during execution from a memory heap. Memory leak diagnostic tools rely on obtaining snapshots of the memory heap for analysis. The solution offered by these tools often requires differencing heap snapshots, then tracking allocation and/or usage at a fine level of detail. However, these techniques are not adequate for large-scale, enterprise applications because of the amount of memory resources required to hold multiple snapshots of the memory heap.

Figure 1:
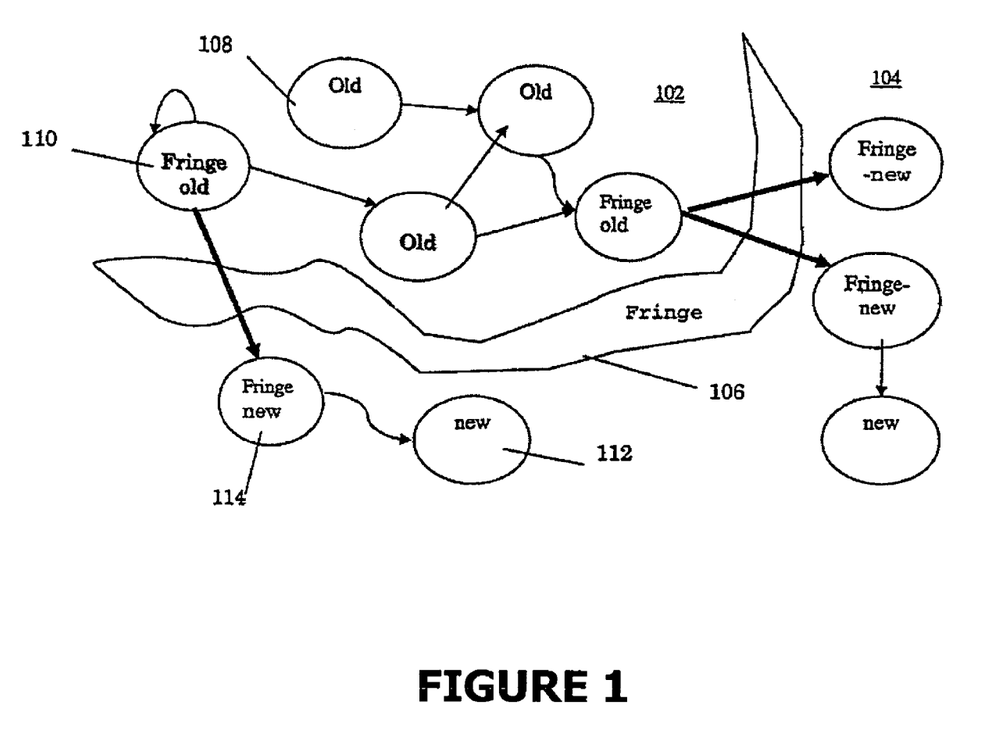
FIG. 1 illustrates a representation of objects including older objects and recently created objects and a boundary or fringe between them, which is useful in identifying a memory leak, according to the known art.

Many existing memory management tools work by dividing a program heap into old objects and newer objects, under the assumption that the older objects are more likely to be permanent. FIG. 1 illustrates a set of objects 100 including older objects 102, recently created objects 104, and a boundary or fringe 106 between them. By classifying the objects, the programmer manually tries to discover why the newer and therefore ostensibly more temporary objects are being retained, by exploring the boundary (or fringe) 106. Conventionally, an object is "on the fringe" if it is a new object pointed to by an older object. The objects 102 in the older side of fringe 106 comprise old objects 108 and fringe-old objects 110. The objects 104 in the new side of fringe 106 comprise new objects 112 and fringe-new objects 114. This scheme of classifying objects by age and fringe relationship is a common method to analyze possible sources of program memory leaks. This manual method of leak analysis is time-consuming and difficult to implement.

To diagnose a memory leak, a programmer must look for a set of candidate data structures that are likely to have problems. Finding the best data structures on which to focus is difficult. As discussed herein, when exploring reference graphs (representing currently "live" objects and their references) of large application programs, issues of noise, complexity, and scale make this a daunting task. For example, e-business servers intentionally retain a large number of objects in caches. Existing analytic approaches require that the programmer manually distinguish these cached objects from truly "leaky" ones. In general, these approaches swamp the programmer with too much low-level detail about individual objects, and leave the programmer with the difficult task of interpreting detailed information in complex reference graphs or allocation paths in order to understand the larger context. This interpretation process requires a lot of expertise and many hours of analysis in order to identify the actual object which is causing a memory leak. Moreover, these techniques may perturb the application program so much as to be of little practical value, especially in production environments, making them inadequate for memory leak detection in enterprise systems.

Many application programs have properties, common to many Java applications, which make memory leak diagnosis especially difficult. These applications make heavy use of reusable program frameworks and code libraries, often from varied sources. These framework-intensive applications contain large amounts of program code in which the inner workings are not visible to application program developers, let alone those doing memory leak diagnosis. Server-side e-business applications make use of particularly large frameworks, and introduce additional analysis difficulties due to their high degree of concurrency, scale, and long-running nature.

Existing tools have been used to help diagnose leaks. For example, the Java H Profiler tool (HPROF) works by categorizing each object according to its allocation call path and type. As the program runs, HPROF makes "notes" of every object allocation: it remembers the call stack of the allocation and the allocated datatype. In this way, HPROF assigns a data pair (STACK, TYPE) to each allocated object. As the program runs, it records statistics of these data tuples. For example, it records how many allocations map to each tuple, and how many allocated, but not yet freed allocations, map to a tuple. Then, when the program completes (or when the tool user requests), HPROF sorts the histogram by the "live" statistic, and prints out the current top-N entries Alternatively, some recent work uses static semantics to enforce and detect ownership using ownership types. Data structures are said to be composed of the objects they "own." Thus, to diagnose a memory leak, one must identify the data structures which own leaking objects.

Data Structure Complexity

Knowing what type of leaking object predominates in a program, often a low-level type object such as a character string (String), does not help explain why a memory leak is occurring, because Strings are likely to be used in many contexts, and even may be used for multiple purposes within the same high level data structure such as a Document Object Model (DOM) document. In addition, presented with the context of low-level leaking objects, the programmer analyst may easily get lost trying to identify a source of the leak. For example, a single DOM object may contain many thousands of sub-objects, all with a rich network of references among them. Without knowledge of the implementation of the DOM framework, it is difficult to know which paths in the reference graph to follow, or, when analyzing allocation call paths, which call site is important to the memory leak analysis.

Scalability Considerations

When studying graphs with a very large number of nodes and edges, issues of scalability may not be ignored. The types of analyses enabled by the present invention include typical graph analyses that compute relations between nodes or edges (such as computing dominance or "reachability"), analyses performed by programmers (by presenting the graphs visually), and other specialized analyses (such as analyzing graphs to determine the way in which nodes are growing). To be useful, whether done automatically or by visual inspection, the analysis should complete in a reasonable amount of time and space, without losing details critical for the analysis at hand.

For example, consider the problem of analyzing graphs with twenty million nodes and forty million edges on a machine with one gigabyte of memory. To fit every node and edge into that machine's memory, the analysis needs to constrain every node and edge to occupy no more than 18 bytes each. This number may be further restricted by the space required for the analysis itself, and the overhead requirements that come with analysis environments today (e.g., the Eclipse integrated development environment for a large-scale software project may reach several hundred megabytes). This, and other baseline constraints, quickly lower this requirement to below ten bytes per node and edge. As an example, the Hyades trace model requires about sixty (60) bytes for every Java object. Similarly, to fit this scale of graphs onto a visual display with two megapixels would require at least thirty-two (32) "pages" worth of scrollable area, in both dimensions.

Present solutions to the problem of analyzing single, large graphs include: visual graph layout, node and edge clustering/classification, graph compression, node and edge elision, and statistical (i.e., large sample set) analysis. One important aspect of these solutions is the level of scalability of the subsequent analysis which they allow. All other things being equal, this aspect should be optimized. However, there's another important property of these approaches that works against ultimate scalability: the extent to which the approach preserves certain topological properties of the initial graphs. For example, if an analysis needs the identity of nodes or the reachability or dominance relations to be preserved, then certain of these approaches won't help: aggregation, which maps the nodes and edges to feature vectors (and thereby eliminates the nodes and edges entirely), or compression, which generates new nodes that represent whole sub-graphs in the initial graph. To further constrain matters, certain analyses require data from more than one graph. For example, an analysis of how graphs grow over time, such as graphs used in diagnosing memory leaks, may benefit from the study of multiple snapshots of that graph's state over time.

The following articles provide additional information useful to understanding the problems presented here, and to that effect are herein incorporated by reference. Inderjeet Mani and Eric Bloedorn, "Summarizing Similarities and Differences Among Related Documents," Journal of Information Retrieval, volume 1, pp. 35-107; Graham J. Wills, "Nicheworks: Interactive Visualization of Very Large Graphs," Journal of Computation and Graph Statistics, volume 8, number 2, pp. 190-212; Anna C. Gilbert and Kirill Levchenko, "Compressing Network Graphs," Workshop on Link Analysis and Group Detection, 2004; Neoklis Polyzotis and Minos Garofalakis, "Structure and Value Synopses for XML Data Graphs," The Proceedings of the 28th Very Large Data Bases Conference.

In addition, the following U.S. patent applications are herein incorporated by reference: Nick Mitchell and Gary Sevitsky, U.S. patent application Ser. No. 10/1073,848, Automated, Scalable, and Adaptive System for Memory Analysis via the Discovery of Co-Evolving Regions; and Nick Mitchell and Gary Sevitsky, U.S. patent application Ser. No. 10/1073,837, Automated, Scalable, and Adaptive System for Memory Analysis via Identification of Leak Root Candidates.

New Approaches are Needed

It is apparent from the discussion above that existing approaches provide little assistance in memory leak analysis. Existing approaches require that tools or users either model everything in the graph, which doesn't work because resources are constrained, or enforce some fixed summarization policies, which does not provide the flexibility needed to solve such complex problems. Programmers must rely on their own often limited knowledge of how applications and frameworks manage data in order to segregate objects by the likelihood of being the source of memory leakage. Therefore, there is a need for a system that overcomes the drawbacks discussed above.

SUMMARY OF THE INVENTION

Various aspects of the present invention may be illustrated by a method, information processing system, and computer readable medium for annotating very large graphs to allow for subsequent quick loading and analysis. The present invention encompasses a way to order and annotate nodes of a graph into a data stream that allows for optimization of subsequent processing of nodes in later analysis. For example, a very large reference graph representing heap snapshots may be annotated to facilitate post-processing and visualization of the graph for memory leak analysis. In such an example, the present invention reduces the number of objects and references to be modeled in memory, while still capturing the essence of the non-modeled portions. In this example, the present invention may process reference graphs on the scale of one hundred million live objects per snapshot using a computer with one gigabyte of memory.

Given an input of a pair of object reference graphs, the present invention produces an ordered graph with annotations for each object which are ordered in way that allows the subsequent analysis to process the resultant graph using a streaming, one-pass loader, which greatly reduces the memory required to analyze a very large graph. This is accomplished by identifying a key set of attributes which are synthesized from its constituent objects and inherited from the object owners. This method relies on an annotation policy, which may be altered based on the analysis to be performed. The solution of the present invention is scalable to very large graphs.

According to the present invention, an information processing system is described which implements the above method on a general purpose computer system. A computer readable medium encompassing the present invention is also described.

The subject matter, which is regarded as the invention, is particularly pointed out and distinctly claimed in the claims at the conclusion of the specification. The foregoing and other features, and also the advantages of the invention, will be apparent from the following detailed description taken in conjunction with the accompanying drawings. Additionally, the left-most digit of a reference number in the accompanying figure identifies the figures in which the reference number first appears.

DETAILED DESCRIPTION

The present invention provides a method, computer readable medium and information processing system for annotating graphs to allow quick loading and analysis of very large graphs, as described herein. In the following description, numerous specific details are set forth by way of exemplary embodiments in order to provide a more thorough description of the present invention. It will be apparent, however, to one skilled in the art, that the present invention may be practiced without these specific details. In other instances, well-known features have not been described in detail so as not to obscure the invention. The preferred embodiments of the inventions are described herein in the Detailed Description, Figures and Claims. Unless specifically noted, it is intended that the words and phrases in the specification and claims be given the ordinary and accustomed meaning as understood by those of skill in the applicable art. If any other meaning is intended, the specification will specifically state that a special meaning is being applied to a word or phrase.

The architecture of an information processing system of the present invention may include some or all of the following provisions. This description is provided for illustration alone. The present invention would encompass many changes to this architecture. While the following description contains numerous specific details, such as annotation examples, demonstrative representations of graphs, example problem sets, and architectural elements or algorithms details, these details are described only to provide a more thorough description of the present invention. The invention is not intended to be limited to these specific details.

Factors in Very Large Graph Analysis

This description includes embodiments intended to assist in understanding how very large graphs change over time. The present invention includes at least one embodiment for understanding a particular type of very large graph, an object reference graph used to diagnose memory leaks. The invention provides a method to allow multi-snapshot analyses in a constrained memory environment which maintains node identity through iterative annotation and containment of node and edge data. Because the representation of each node or edge of an object reference graph may be made only so small before running into space constraints, a high degree of flexibility in the method is provided. Because the present invention orders and annotates nodes of the input graphs without excluding any nodes from its output stream, it provides flexibility to the subsequent analysis process to consider which nodes or edges are important at any point during the subsequent analysis.

Figure 7:
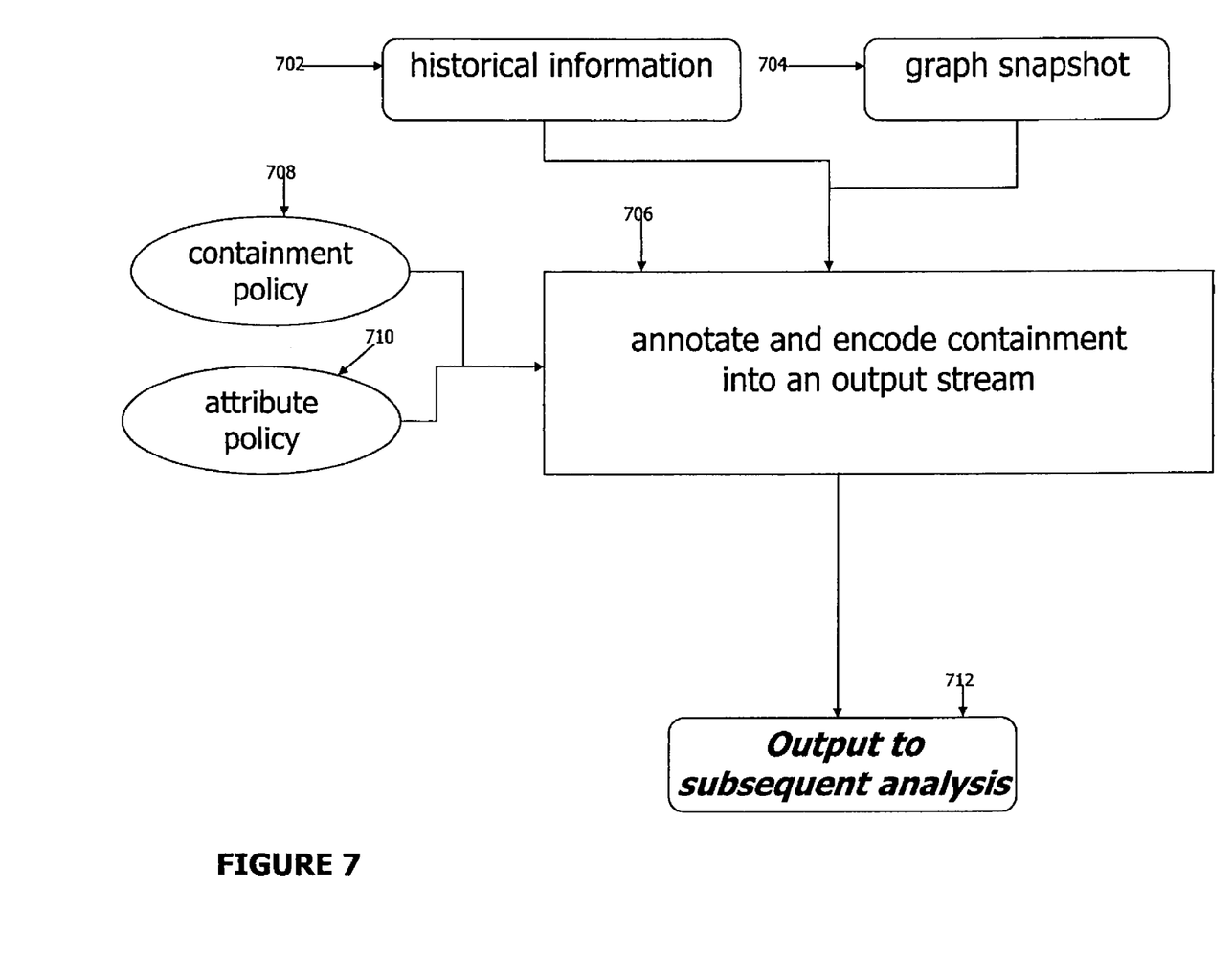
FIG. 7 illustrates the use of policies in annotation process, in one embodiment of the present invention.
Figure 8:
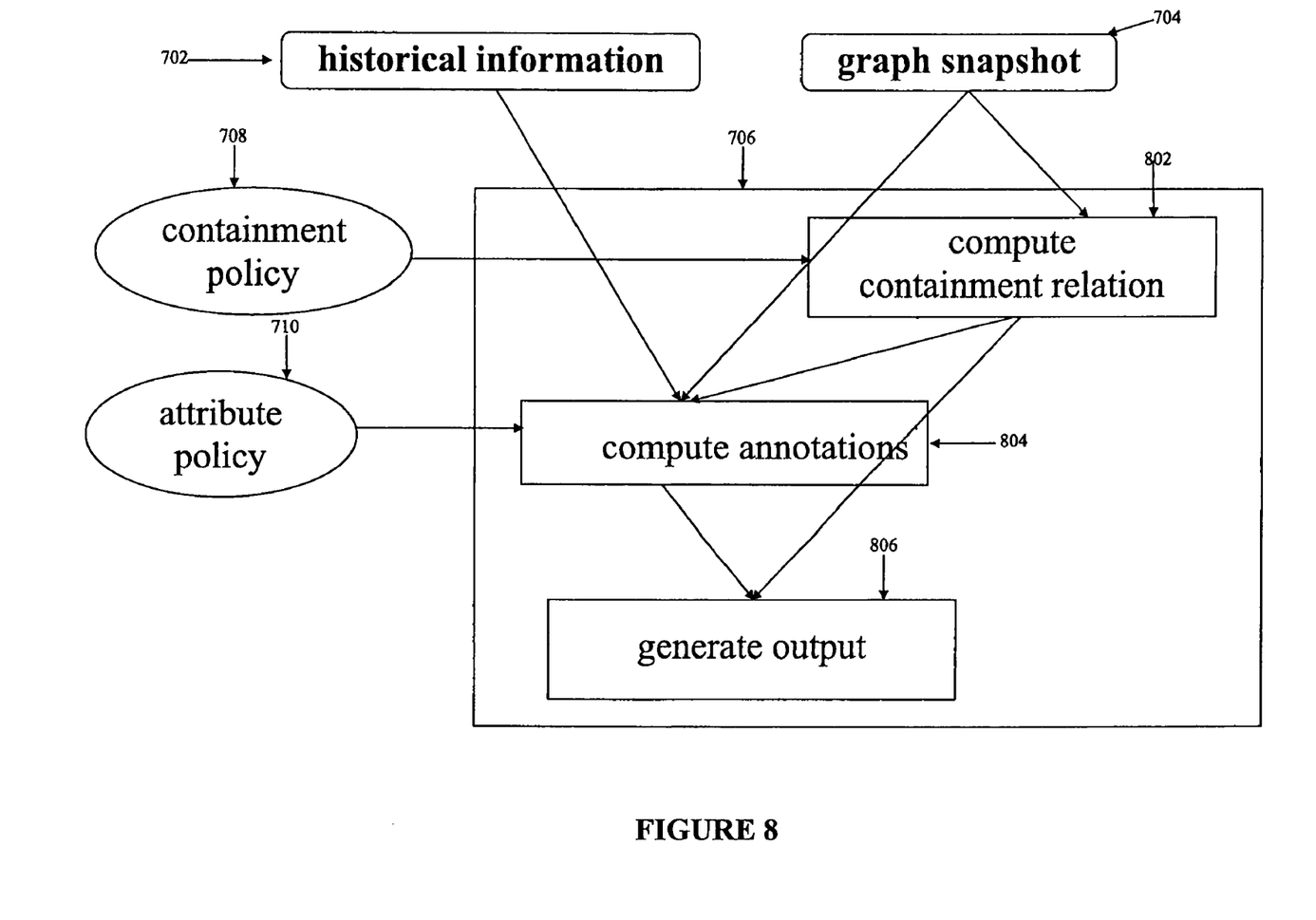
FIG. 8 illustrates additional detail of the annotation process, in one embodiment of the present invention.
Figure 9:
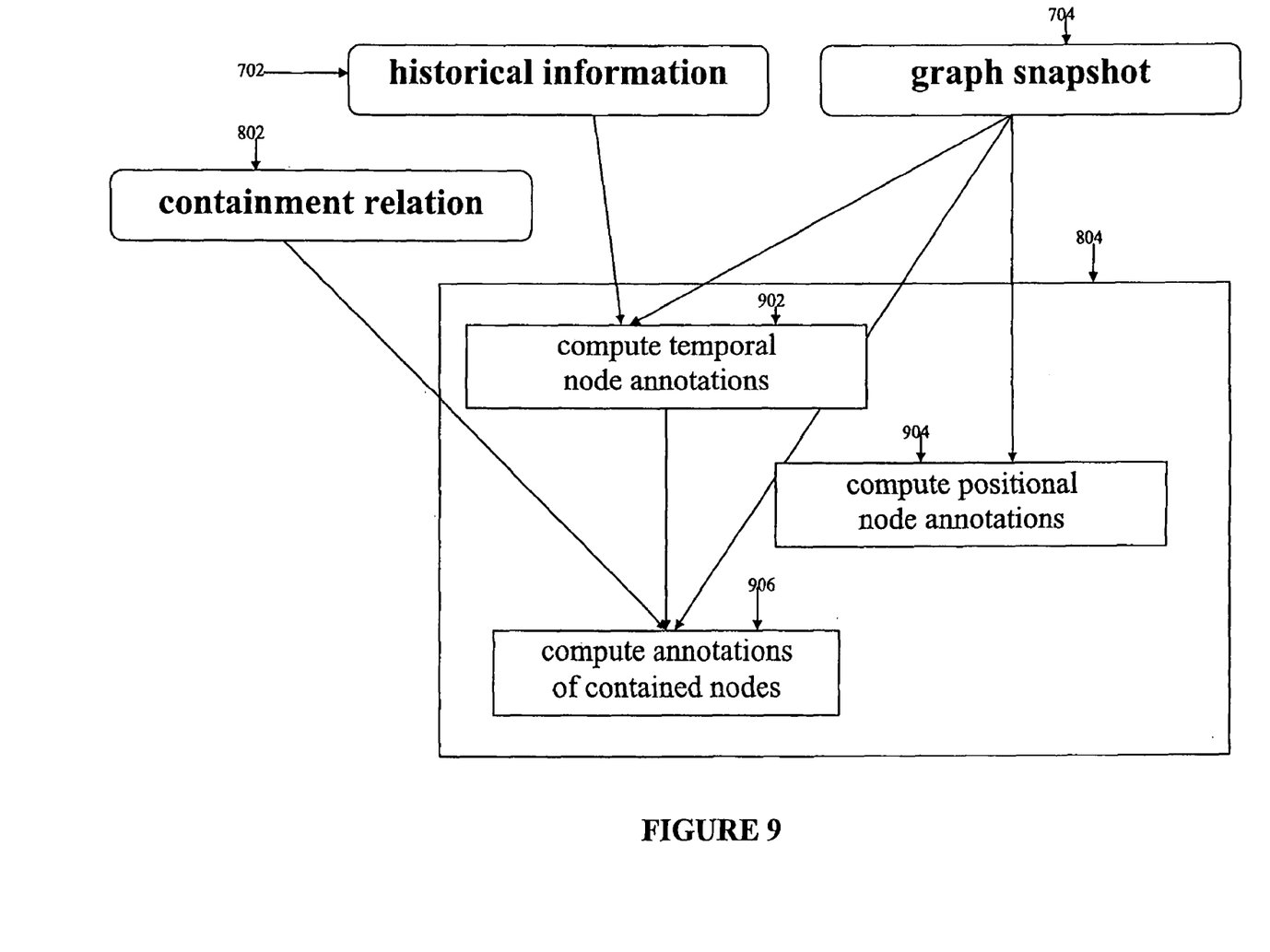
FIG. 9 illustrates additional detail of the computing annotations process, in one embodiment of the present invention.

The present invention may be understood to comprise at least the following steps, as illustrated as in FIGS. 7, 8 and 9. Input to the process is Historical Information 702, which may be population snapshots, and Graph Snapshot 704, the single graph snapshot to be processed in the current iteration of the process. In an overview of the process, Step 706, represents annotating and encoding containment of data into an output data stream ready for post-processing. The output of the present invention may be provided as streaming input to a post-processing application which may perform post-processing graph summarization. Following the annotation phase, the output data stream may be made available for subsequent analysis at Step 712, labeled "Output to Subsequent Analysis," and may then be used for memory leak analysis by conventional memory leak analysis tools. Further details of the processes of Step 706 are provided below.

Graph Representation

One problem to be solved in preparing an output data stream representing an annotation and containment of very large graphs is how to represent the graph's nodes and edges in memory without requiring even more memory than the input graph itself requires. One solution is for the process to "stream" through the nodes and edges, performing the entire analysis task without creating an intermediate representation of the very large graph (in this example, a heap snapshot). Certainly some types of analyses would behave well with a streaming model. For example, generating a histogram of nodes based on some attribute of the nodes could be done without using an intermediate representation of the underlying graph. However, many others types require an intermediate form, for efficiency reasons and because the analysis must perform several passes over some subset of nodes and edges of the very large graph.

How may an intermediate representation of the nodes and edges of a very large graph fit into reasonable space constraints? One way would be to minimize the cost per represented element. However, if space costs per element are minimized (e.g., one screen pixel for each representation, or ten bytes of memory each), the memory required to represent the entire graph may still exceed the available resources. It may be preferable to find a way to reduce the number of represented elements, not the size per represented element.

For an analysis that requires an intermediate representation, a process that allows the representation to be decomposed into a series of sequential sub-analyses, each of which represents only a small subset of all elements of the graphs, is preferred. To do this, the solution may utilize a policy regarding which nodes and edges are necessary for the analysis, and implement that policy as the process streams through the set of all available nodes and edges. A policy, in this sense, is information that guides the present invention in identifying annotations to be created for nodes and edges to be represented in the output data stream. FIG. 7 illustrates the use of such a policy in one embodiment of the invention. Containment Policy 708 implements a policy governing the relation between the nodes and edges to be represented in the output data stream of the present invention, and may vary depending on the problem to be solved by the graph analysis process. Containment Policy 708 may be used to derive an overlay graph with one or more additional edges that represent relationships between nodes not found in the original graph. Implementing a policy in the subsequent analysis to identify necessary nodes over a stream is important, because representing all the nodes and edges would not provide a solution to the memory required for representing very large graphs for analysis.

The Multiple Ownership Dilemma

A further complication to memory leak analysis, and other problems which may be solved by the present invention, is that a node in a series of graph snapshots may exhibit multiple ownership; that is, a node may be a root of the dominator forest, but it may not be a root of the graph. In reducing the relationships between nodes of the graph, a single node must be selected as the owner of the multiply-owned node. For example, there are two graph shapes that may lead to a problem in resolving the dominator relation: one is "V-shaped" graphs. In a graph where node a and node c both "own" node b (and thus may be represented in a "V" shape) the dominator forest will indicate a, b, and c as roots. The second problem may arise with "diamond-shaped" graphs. In a diamond-shaped graph, the node at the tail of the diamond is owned by the node at the head of the diamond, in which case there will be a dominator edge that isn't an edge in the original graph.

As often happens in Java programs, when an object O is shared by two data structures D1, D2, which can be said to dominate O? If D1 and D2 are part of just one higher level data structure H, then the classic dominator relation will indicate that shared object O is only dominated (owned by or related to) H. In determining data structures evolution, this relation is misleading, because D1 and/or D2 may be the cause of a memory leak in O, yet the dominator tree would indicate H as the only source of leak by O. There is also a problem when D1 and D2 are not owned by a common higher level data structure. In that case, the classic dominator relation will indicate that O is related to nothing (except itself, because by definition every object dominates itself). This representation would be even more misleading for memory leak analysis.

Figure 3:
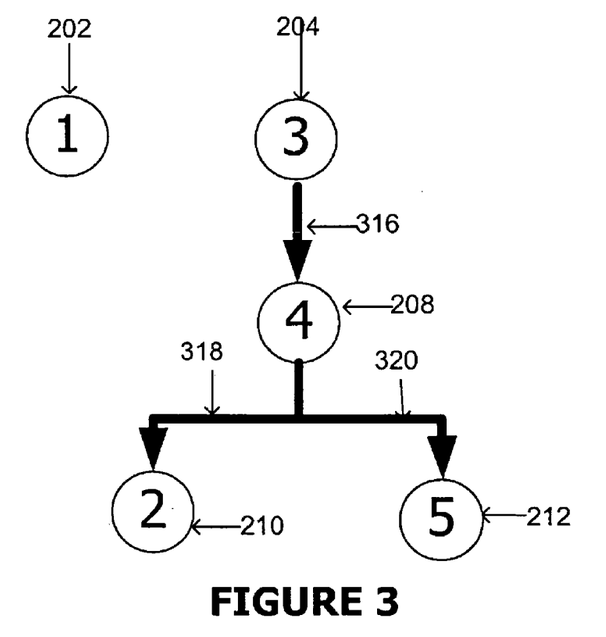
FIG. 3 illustrates imposition of a spanning tree on the object reference graph of FIG. 2, according to one embodiment of the present invention.

Therefore, for multiply owned nodes, the present invention may make use of a collection of heuristics to choose one of the incoming edges of the node, and assign the related parent as a node's immediate dominator. The term "immediate owner" may indicate an immediate dominator in the classical sense, except in the case where a heuristic of the present invention is applied. In the case of a V-shaped or diamond-shaped immediate dominator relation, the present invention may apply a heuristic to select a more appropriate parent in the containment relation. This modified dominator relation is referred to herein as an 'ownership' relation. FIG. 3, described below, provides an example of the application of an immediate dominator relation to solve the multiple ownership problem.

Therefore, it is desirable to solve this "multi-ownership" dilemma. A heuristic approach may be implemented to choose one of D1 or D2 as the owner of O. The heuristics may rank D1 and D2 based on which is more likely to be an informative owner; e.g., not an artifact of the programming language, such as the finalizer queue of Java, and preferring permanent roots as owner instead of on-stack, transient roots.

Creating the Data Stream

As described above, one form of input to the present invention may be a sequence of population snapshots and a single graph snapshot of memory heaps that are used to analyze memory leaks. FIG. 7, as described above, represents an overview of the process of creating the output data stream. FIG. 8 represents a more detailed view of Step 706, and produces an intermediate form of the output data stream. FIG. 9 zooms in even farther to show how Step 804 determines node annotations.

In FIG. 8, the sequence of population snapshots are represented by Historical Information 702, and the single graph snapshot is represented as Graph Snapshot 704. The present invention may process the snapshots in three ways: first, by re-naming each of the nodes, and by ordering the nodes in particular way. This is done by Step 802, Compute Containment Relation, using Containment Policy 708. Second, the invention may associate additional annotations with the nodes at Step 804, Compute Annotations Annotations may include, for example, the age of nodes, relative position of nodes, types of nodes, and/or other information as determined by Attribute Policy 710, which may be tailored to the problem to be solved. Third, Annotation and Containment information is combined at Step 806, Generate Output, to produce the output data stream, which might become an input to a subsequent Summarizing Loader. Output here may be thought of as a data stream to distinguish it from the input, which is a set of Historical Information 702 and Graph Snapshot 704. No ordering need be assumed in the input between the elements in the snapshot. The combination of these steps produces an output that allows a later analysis process to make summarization decisions in a streaming fashion, greatly reducing the amount of memory required for that processing.

Re-Naming Nodes

The process of the present invention traverses a graph's edge relations, from the root nodes in a depth-first fashion to determine a node's temporal and positional annotations. These computations are illustrated in FIG. 9, at Steps 902 and 904. The traversal of the snapshots, accounting for position and age of the nodes, yields a depth-first numbering of the nodes in the graph. The present invention uses this numbering as the identity (or new identity) of the nodes in the output stream. This may also be referred to as "naming" or re-naming the nodes, but it may also preserve the mapping between the current and prior node "namings." Next, Step 906 processes Containment Relation 802, Graph Snapshot 704, and the temporal annotations from Step 902 to produce a contained and annotated output data stream, for input to Step 806.

One type of node of particular interest, and which required particular identification, is root nodes. In the present invention, root nodes may be identified by Step 904. For the purposes of this process, root nodes may be identified as those nodes with no incoming edges, nodes with an a priori designation as roots, and nodes that are elements of a strong-connected component, no constituent of which component has an a priori root designation, nor an incoming edge emanating from outside said component.

Figure 2:
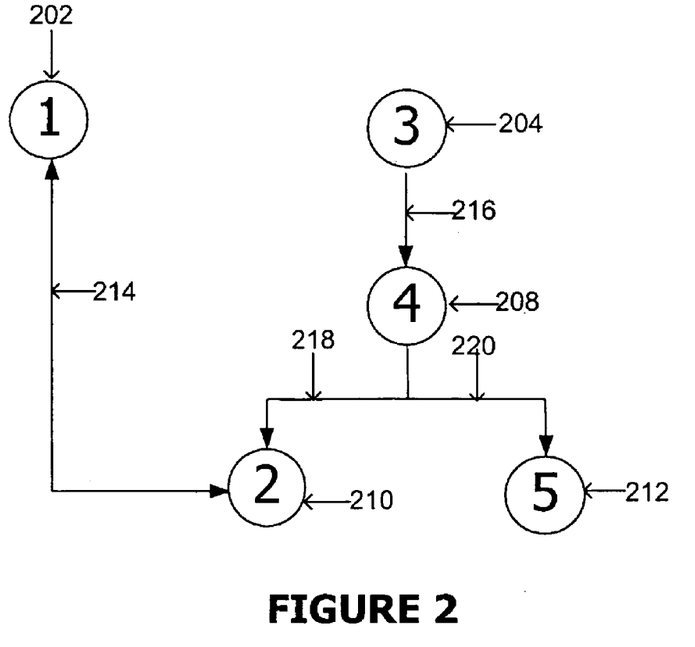
FIG. 2 illustrates an object reference graph which may be input to the present invention

An example of the process of naming nodes using their edge relations may be seen in FIGS. 2 and 3. FIG. 2 illustrates an object reference graph which might be presented as input to the present invention. Here, Node 202 is given an identifier "1," and can be referred to as having been "named" node number "1". Node 204 may be named node number "3," and so forth, proceeding depth-first. The edges between the nodes represent object ownership relationships. By way of example, node 204 represents an instance of a vector object, node 208 represents an array object, node 210 represents an instance of a String object, and node 212 represents an instance of another String object. Node 202 in this example represents an instance of a Java "finalizer" for the String represented by node 210.

FIG. 3 represents the same object reference graph modified by one embodiment of the present invention into a spanning tree, imposing a depth-first numbering on the nodes of the object reference graph of FIG. 2. It should be noted that edge 214 between nodes 202 (1) and 210 (2) has been eliminated, while edges 216 through 220 have been retained (emphasized). In producing a spanning tree for a graph of the type illustrated in FIG. 2, where a node 210 is dominated by multiple nodes, the heuristic of the present invention prefers the relationship most likely to result in a useful representation of the ownership of the node. In this case, either node 202 or node 208 could be selected to "own" node 210.

Ordering Nodes

Having identified the nodes and computed the dominator relation over the input graph snapshot, the present invention may next order the nodes into an output stream by traversing the dominator forest, starting from the forest roots and in depth-first order. The traversal produces an output data stream as ordered by the following process.

A sub-tree is identified using particular markers inserted into the output data stream. For example, if an open parenthesis "(" indicates the node at the top of a sub-tree and a closed parenthesis ")" indicates the end of that sub-tree. In one embodiment of the invention, parentheses may be used as the marker. Other embodiments may select other markers. In the example using parenthesis as a marker, the invention may thus generate a "parenthesized" form of the graph, where nesting indicates the dominator relations.

Figure 4:
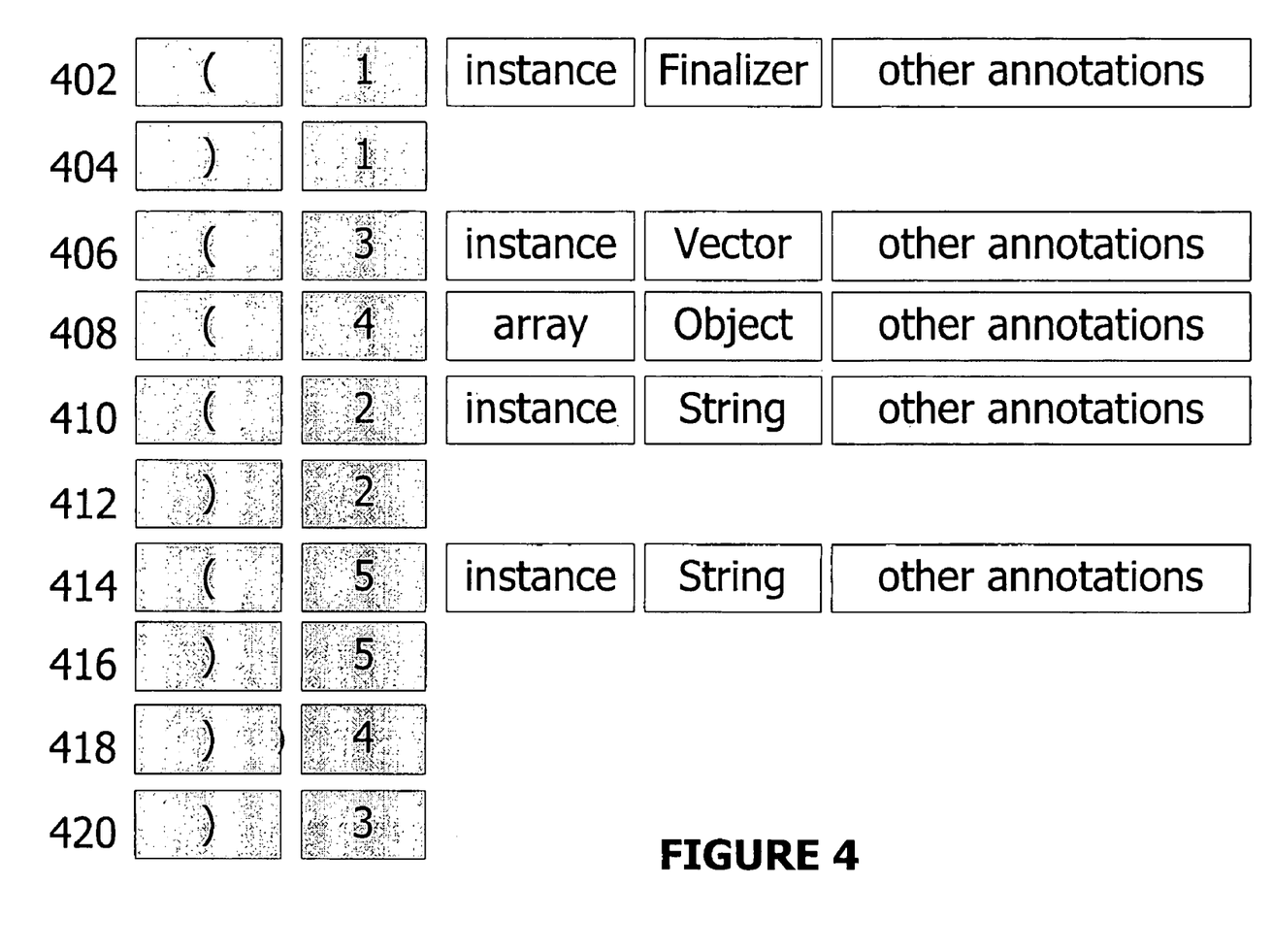
FIG. 4 illustrates annotations, of an object reference graph according to the present invention, in which the annotations are shown in an ordered sequence as represented by nested parenthesis, in one embodiment of the present invention.

FIG. 4 provides an example of an output stream of ordered nodes as described by the spanning tree of FIG. 3. Node 202 is represented in the output data stream by row 402 and 404 of FIG. 4. The data stream tokens open parenthesis and node identifier "(1", followed by tokens representing the node (object) kind and type, and other appropriate annotations, form the output data stream of the present invention. As in FIG. 3, node 202 is a root node with no sub-tree, and thus it only dominates itself. Therefore, row 404 of FIG. 4 indicates the end of the sub-tree, because the next element in the output data stream contains closing marker tokens ")1".

The next entry in the data stream indicates the beginning of new root node 204, represented here by "(3", and its annotations in row 406 of FIG. 4. Node 204 "owns" node 208, and thus the next markers in the data stream are "(4" and the annotations for node 208, as shown in row 408. Node 208 owns nodes 210 and 212, thus the next markers are "(3" and its associated annotations, as shown in row 410. Row 412 contains the closing markers for node 210, ")3," because node 210 has no sub-tree. The sibling of node 210 in the spanning tree is node 212, which is represented by markers "(5" and node 210's annotations, and is closed with markers ")5", as shown in rows 414 and 416. As node 208 has no other sub-tree nodes, it may be closed next in the data stream with markers ")4," as shown in row 418. As node 204 has only node 208 as a sub-tree, that node may then be closed with markers ")3," as shown in row 420. The process described here by example is seen in the data stream represented by FIG. 4.

Annotating Nodes

The present invention may relate various annotations with each node according to an annotation policy. In one embodiment the invention may use various annotations for each node, as exemplified below. To reduce the bandwidth required for the output stream, alternative embodiments may not utilize all of these example annotations. However, as described below under Analyzing The Data Stream For Memory Leaks, it may be seen that the annotations A5-A10 may be of highest importance for the purpose of reducing the space and time required for subsequent analysis.

A1: the node's immediate dominator

A2: the node's immediate owner

A3: the node's original identification

A4: the intersection of all root annotations that reach this node

A5: whether the node is nascent

A10: whether the node is on the fringe

A7: whether the node "owns" only nascent ("new") nodes, not counting itself

A8: whether the node "owns" only non-nascent ("old") nodes, not counting itself

A9: whether the node matches some change proxy of the graph

A10: whether the node "owns" a node with A9 annotations, not counting itself

A11: whether the node is part of a non-array backbone

The A7, A8, A10 annotations are exclusive and complete: a node either owns only nascent nodes (A7), or it owns only non-nascent nodes (A8), or it owns a combination of the two. In the latter case, it must own some nodes on the fringe, on the boundary between non-nascent and nascent. By the definitions provided in U.S. patent application Ser. No. 10/1073,848, that node must own objects with the change proxy property (A10).

Figure 5:
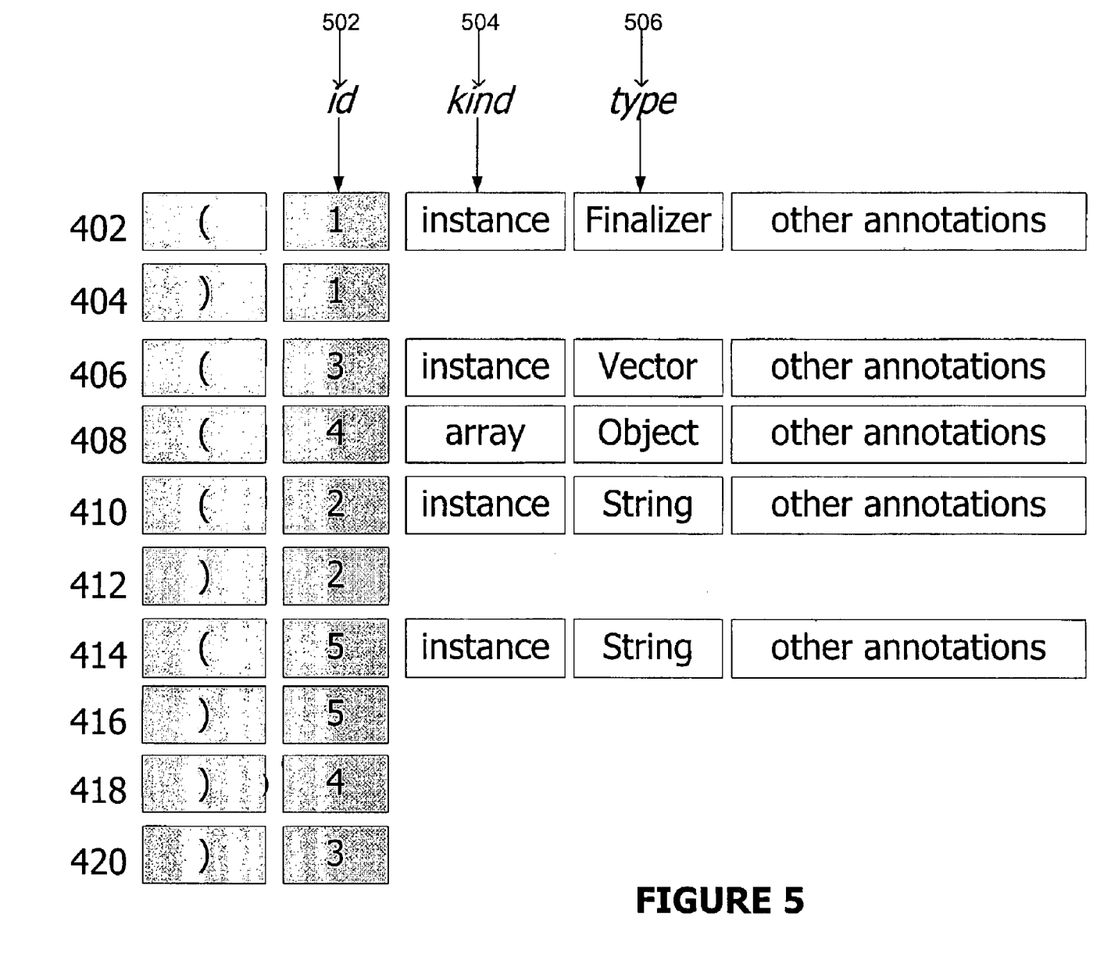
FIG. 5 illustrates annotations of standard attributes of graph nodes, where the graph nodes represent objects in a running program, in one embodiment of the present invention.
Figure 6:
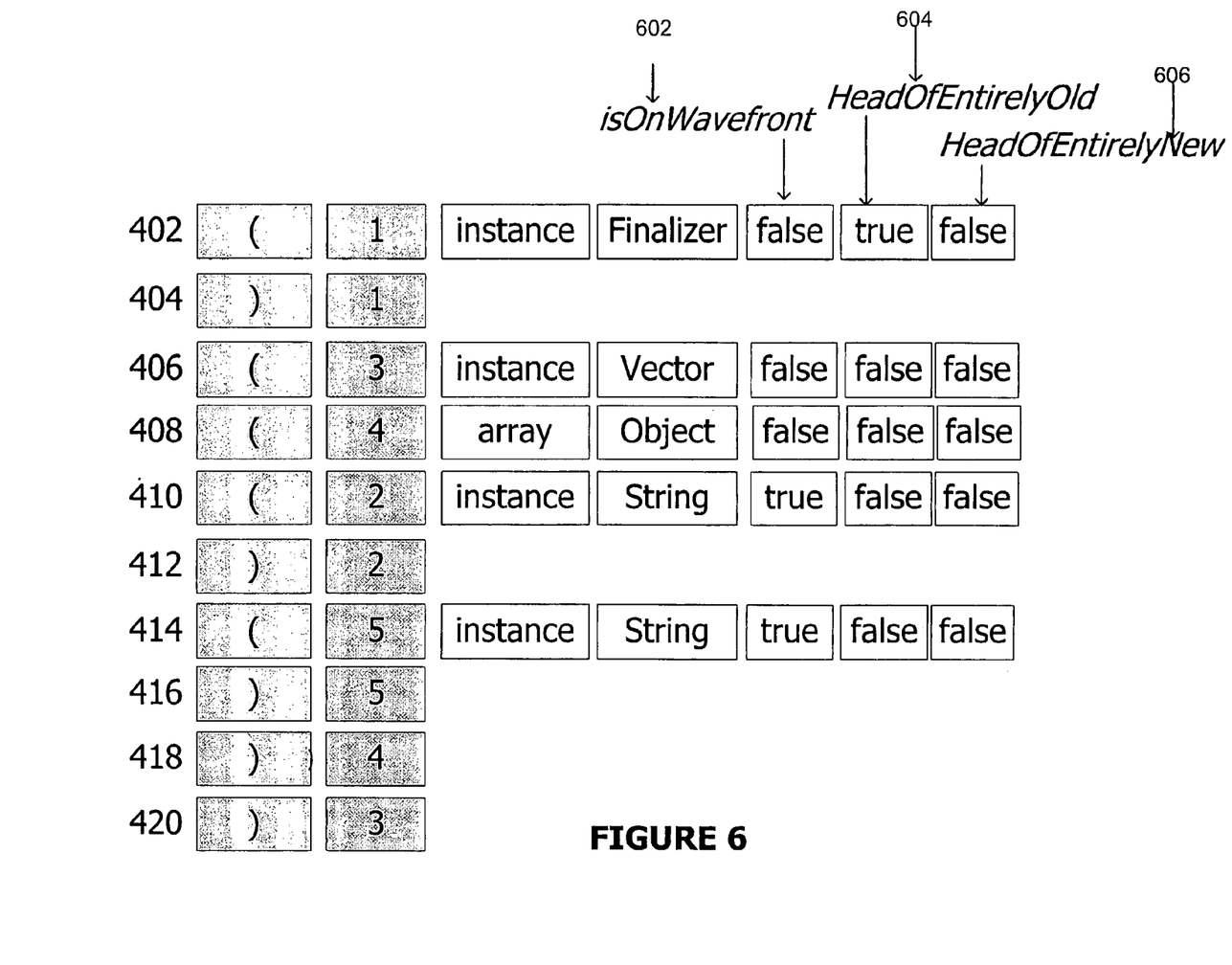
FIG. 6 illustrates annotations of additional attributes of graph nodes, where the graph nodes represent objects in a running program, in one embodiment of the present invention.

FIG. 5 illustrates how the data stream of FIG. 4 includes annotations including node identifiers (id 502), node kind (kind 504) and node type (type 506). Id 502 may correspond to annotation A3 above. Other key annotation types may be represented in FIG. 6, which illustrates the use of some other annotation options. For example, isOnWaveFront 602 may correspond to annotation A10, while headOfEntirelyOld 604 may correspond to A8, and headOfEntirelyNew 606 may correspond to A7. In these examples, the stored annotations are Boolean values, though nothing in the present invention is limited to Boolean annotations.

Analyzing the Data Stream for Memory Leaks

Through the foregoing, the annotated nodes have been processed into an output data stream. The processing may depend on the process' current state as governed by the annotations and a finite state machine of the invention. As such, the process may choose a policy such that it models only a small fraction of the nodes and edges. Using such a policy, the process need only model change proxy instances, possibly the ownership chain from those instances to the roots, and possibly an aggregate summary of the objects owned by those change proxy instances. Actual memory leak analysis is not the subject of the present invention, but may be performed using tools well known to those of ordinary skill in the art using the output of the present invention as input to these analysis tools.

A Computer System for Carrying Out the Present Invention

The present invention may be realized in hardware, software, or a combination of hardware and software. A system according to a preferred embodiment of the present invention may be realized in a centralized fashion in one computer system, or in a distributed fashion where different elements are spread across several interconnected computer systems. Any kind of computer system—or other apparatus adapted for carrying out the methods described herein—is suited. A typical combination of hardware and software could be a general-purpose computer system with a computer program that, when being loaded and executed, controls the computer system such that it carries out the methods described herein.

An embodiment of the present invention may also be embedded in a computer program product, which comprises all the features enabling the implementation of the methods described herein, and which—when loaded in a computer system—is able to carry out these methods. Computer program means or computer program in the present context mean any expression, in any language, code or notation, of a set of instructions intended to cause a system having an information processing capability to perform a particular function either directly or after either or both of the following: a) conversion to another language, code or, notation; and b) reproduction in a different material form.

A computer system may include, inter alia, one or more computers and at least a computer readable medium, allowing a computer system, to read data, instructions, messages or message packets, and other computer readable information from the computer readable medium. The computer readable medium may include non-volatile memory, such as ROM, Flash memory, Disk drive memory, CD-ROM, and other permanent storage. Additionally, a computer readable medium may include, for example, volatile storage such as RAM, buffers, cache memory, and network circuits. Furthermore, the computer readable medium may comprise computer readable information in a transitory state medium such as a network link and/or a network interface, including a wired network or a wireless network, which allow a computer system to read such computer-readable information.

Figure 10:
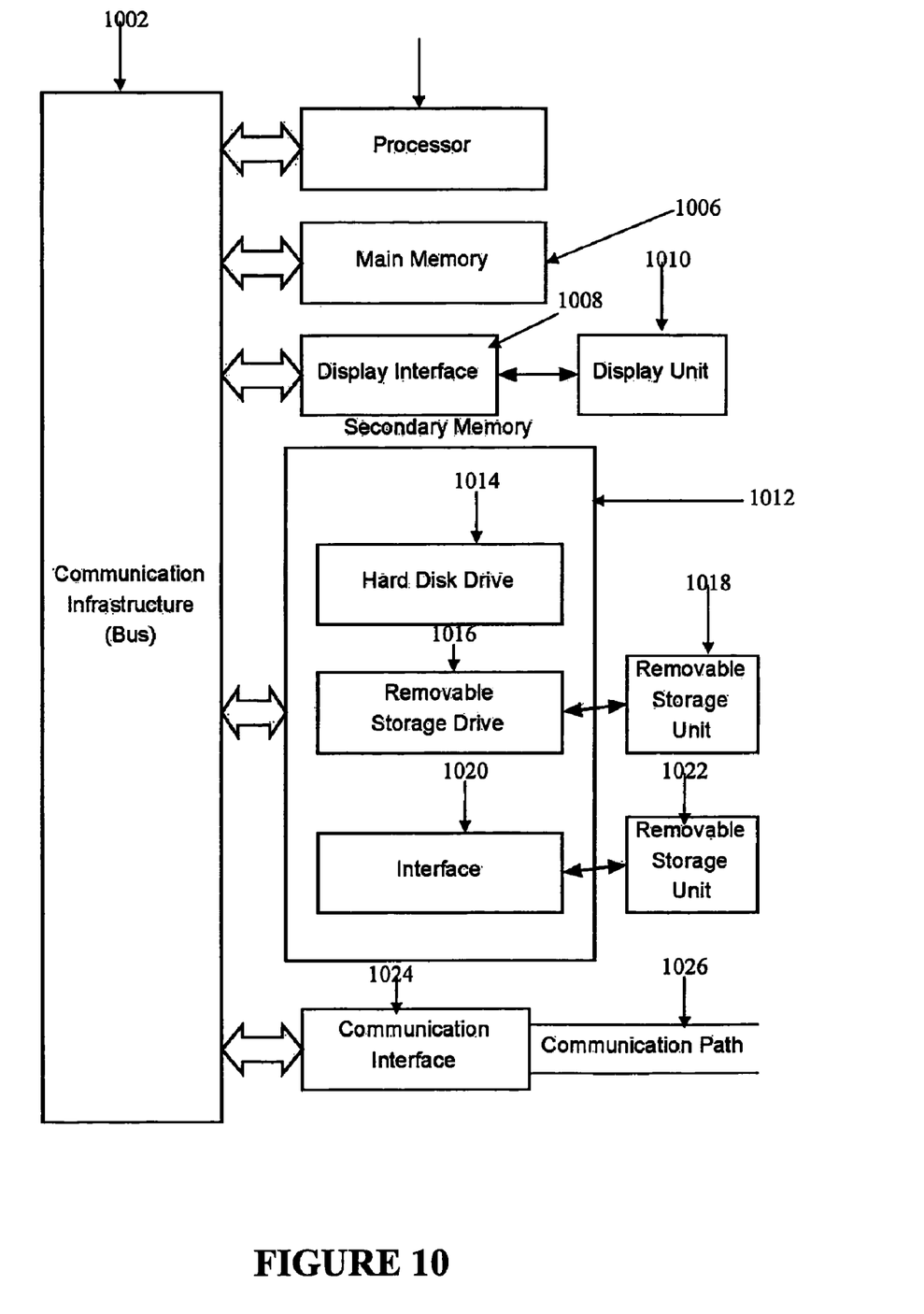
FIG. 10 illustrates an information processing system supporting at least one embodiment of the present invention.

FIG. 10 is a high-level block diagram showing an information processing system useful for implementing one embodiment of the present invention. The computer system includes one or more processors, such as processor 1004. The processor 1004 is connected to a communication infrastructure 1002 (e.g., a communications bus, cross-over bar, or network). Various software embodiments are described in terms of this exemplary computer system. After reading this description, it will become apparent to a person of ordinary skill in the relevant art(s) how to implement the invention using other computer systems and/or computer architectures.

The computer system may include a- display interface 1008 that forwards graphics, text, and other data from the communication infrastructure 1002 (or from a frame buffer not shown) for display on the display unit 1010. The computer system also includes a main memory 10010, preferably random access memory (RAM), and may also include a secondary memory 1012. The secondary memory 1012 may include, for example, a hard disk drive 1014 and/or a removable storage drive 10110, representing a floppy disk drive, a magnetic tape drive, an optical disk drive, etc. The removable storage drive 1110 reads from and/or writes to a removable storage unit 1018 in a manner well known to those having ordinary skill in the art. Removable storage unit 1018, represents a floppy disk, a compact disc, magnetic tape, optical disk, etc. which is read by and written to by removable storage drive 10110. As will be appreciated, the removable storage unit 1018 includes a computer readable medium having stored therein computer software and/or data.

In alternative embodiments, the secondary memory 1012 may include other similar means for allowing computer programs or other instructions to be loaded into the computer system. Such means may include, for example, a removable storage unit 1022 and an interface 1020. Examples of such may include a program cartridge and cartridge interface (such as that found in video game devices), a removable memory chip (such as an EPROM, or PROM) and associated socket, and other removable storage units 1022 and interfaces 1020 which allow software and data to be transferred from the removable storage unit 1022 to the computer system.

The computer system may also include a communications interface 1024. Communications interface 1024 allows software and data to be transferred between the computer system and external devices. Examples of communications interface 1024 may include a modem, a network interface (such as an Ethernet card), a communications port, a PCMCIA slot and card, etc. Software and data transferred via communications interface 1024 are in the form of signals which may be, for example, electronic, electromagnetic, optical, or other signals capable of being received by communications interface 1024. These signals are provided to communications interface 1024 via a communications path (i.e., channel) 10210. This channel10210 carries signals and may be implemented using wire or cable, fiber optics, a phone line, a cellular phone link, an RF link, and/or other communications channels.

In this document, the terms "computer program medium," "computer usable medium," and "computer readable medium" are used to generally refer to media such as main memory 10010 and secondary memory 1012, removable storage drive 10110, a hard disk installed in hard disk drive 1014, and signals. These computer program products are means for providing software to the computer system. The computer readable medium allows the computer system to read data, instructions, messages or message packets, and other computer readable information from the computer readable medium.

Computer programs (also called computer control logic) are stored in main memory 10010 and/or secondary memory 1012. Computer programs may also be received via communications interface 1024. Such computer programs, when executed, enable the computer system to perform the features of the present invention as discussed herein. In particular, the computer programs, when executed, enable the processor 1004 to perform the features of the computer system. Accordingly, such computer programs represent controllers of the computer system.

What has been shown and discussed is a highly-simplified depiction of a programmable computer apparatus. Those skilled in the art will appreciate that other low-level components and connections are required in any practical application of a computer apparatus capable of performing the described invention.

Thus, a method, computer readable medium, and information processing system for annotating graphs to allow quick loading and analysis of very large graphs has been described. Various changes and modifications may be made in carrying out the present invention without departing from the spirit and scope thereof. Insofar as those changes and modifications are within the purview of the appended claims, they are to be considered as part of the present invention.

What is claimed is:

1. A method for annotating an object reference graph for analysis, the method comprising:
    using a processor for identifying information relevant to at least one memory leak in a computer program;
    receiving the object reference graph comprising nodes and edges, wherein each of the nodes of the object reference graph represents at least one object in the computer program;
    forming a spanning tree by traversing the object reference graph beginning at root nodes, in a depth-first manner, while identifying the nodes according to their edge relations;
    defining ownership relations between the nodes using an immediate dominator analysis;
    eliminating redundant dominant nodes;
    iteratively ordering the nodes in the spanning tree according to a containment policy, in order to generate a data stream, wherein the data stream comprises the ordered nodes and at least one edge that represents a relationship between nodes not found in the object reference graph, and wherein the containment policy identifies annotations to be generated to represent the nodes and edges in the data stream;
    naming the ordered nodes according to their order in the spanning tree; and
    annotating the nodes in the data stream with the analysis information to produce an annotated output data stream for subsequent analysis, wherein said annotated output data stream preserves the analysis information in a way which allows scalable post-processing of said annotated output data stream to uncover a source of the at least one memory leak.

2. An information processing system comprising:
    a communications interface configured for receiving as input:
        a snapshot of a very large graph representing objects and their relationships to other objects; and
        historical information comprising a sequence of subsets of the snapshot that exclude the relationships;
    a processor configured for:
        identifying information relevant to at least one memory leak in a computer program by streaming through the snapshot to identify the objects and their relationships that are necessary for an analysis, wherein the objects are represented as nodes;
        iteratively ordering the nodes beginning with a root node according to a containment policy based on the analysis information to produce a data stream, said ordering comprising:
            traversing the snapshot in depth-first order beginning at a root node;
            naming the nodes using the containment policy; and
            eliminating redundant dominant nodes;
        computing node annotations using the containment relations, the snapshot and the historical information, wherein said node annotations comprise node identifiers, node kind, and node type; and
        aggregating the node annotations to the data stream to form an output data stream, while preserving the analysis information such that scalable post-processing of the output data stream is facilitated in order to uncover a source of the at least one memory leak.

3. The information processing system of claim 2, wherein the processor is further configured for ordering the nodes by retaining the nodes that change proxy instances.

4. The information processing system of claim 3, wherein the processor is further configured for ordering the nodes by retaining the nodes within an ownership chain from the change proxy instances to the root node.

5. The information processing system of claim 1, wherein the data stream is produced as a single spanning tree.

6. The information processing system of claim 1 wherein the node annotations comprise temporal and positional annotations.

7. The information processing system of claim 6 wherein the processor is further configured for aggregating the node annotations comprising annotations selected from a group consisting of:
    an immediate dominator of the node;
    an immediate owner of the node;
    original identification of the node;
    an intersection of all root annotations that reach this node;
    whether the node is nascent;
    whether the node is on a fringe;
    whether the node owns only nascent nodes, not counting itself;
    whether the node owns only non-nascent nodes, not counting itself;
    whether the node matches some change proxy of the graph;
    whether the node owns a node with change proxy annotations, not counting itself; and
    whether the node is part of a non-array backbone.

8. The information processing system of claim 1 further comprising a memory configured for storing the output data stream and the analysis information in an order that is optimized for analysis of the memory leak.

9. A computer program product embodied on a computer readable storage medium, the medium comprising computer instructions for causing a computer to perform the following:
receiving as input:
a snapshot of a very large graph representing objects and their relationships to other objects; and
historical information comprising a sequence of subsets of the snapshot that exclude the relationships;
identifying information relevant to at least one memory leak in a computer program by streaming through the snapshot to identify the objects and their relationships that are necessary for an analysis, wherein the objects are represented as nodes;
iteratively ordering the nodes according to a containment policy based on the analysis information to produce a data stream, said ordering comprising:
traversing the snapshot in depth-first order beginning at a root node;
naming the nodes using the containment policy; and
eliminating redundant dominant nodes;
computing node annotations using the containment relations, the snapshot and the historical information, wherein said node annotations comprise node identifiers, node kind, and node type; and
aggregating the node annotations to the data stream to form an output data stream, while preserving the analysis information such that scalable post-processing of the output data stream is facilitated in order to uncover the at least one memory leak.

* * * * *